O. D. HAPGOOD.
REVOLUTION COUNTER.
APPLICATION FILED MAY 13, 1914.
1,172,793. Patented Feb. 22, 1916.
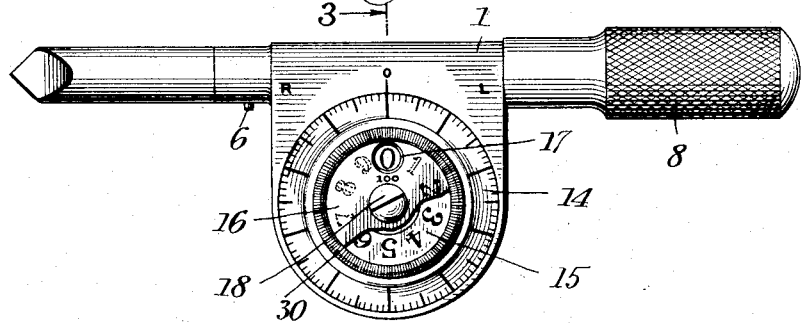
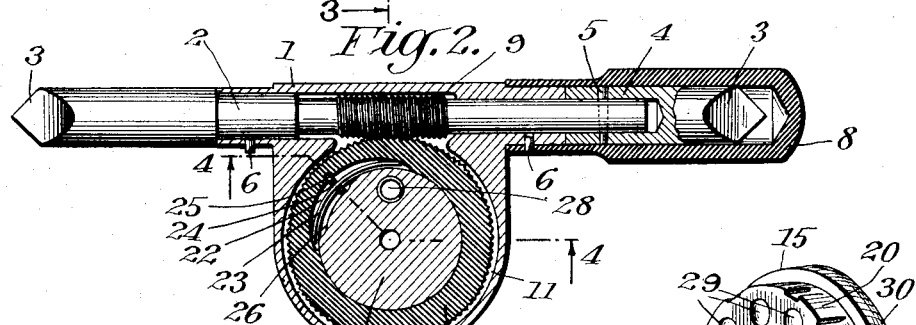
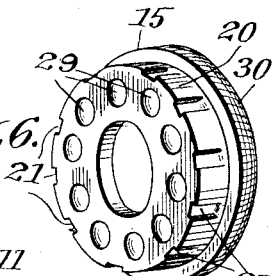
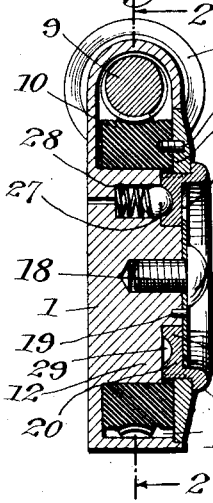
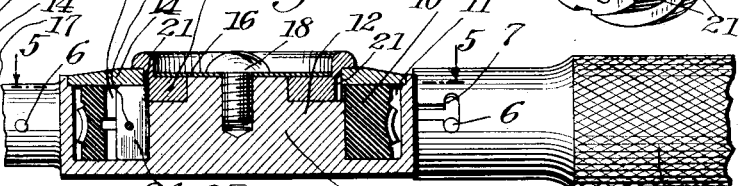
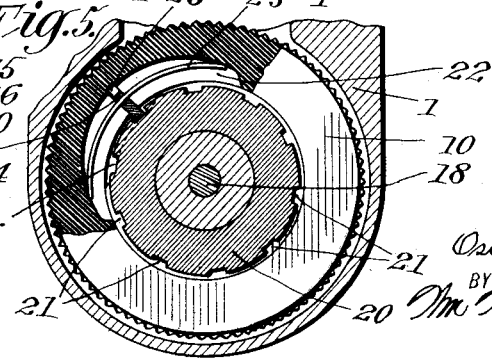
WITNESSES
John C. Sanders
Albert F. Newman
INVENTOR
Oscar D. Hapgood
BY Wm. Wallace White
ATTORNEY

UNITED STATES PATENT OFFICE.

OSCAR D. HAPGOOD, OF ORANGE, MASSACHUSETTS, ASSIGNOR TO GOODELL-PRATT COMPANY, OF GREENFIELD, MASSACHUSETTS.

REVOLUTION-COUNTER.

1,172,793. Specification of Letters Patent. Patented Feb. 22, 1916.

Application filed May 13, 1914. Serial No. 838,255.

*To all whom it may concern:*

Be it known that I, OSCAR D. HAPGOOD, a citizen of the United States, residing at Orange, Massachusetts, have invented new and useful Improvements in Revolution-Counters, of which the following is a specification.

This invention relates to a revolution counter for counting the revolutions of machine shafts and the like.

One of the objects of the invention is to provide a device of this character which may be used right or left handed with equal ease.

Another object of the invention is to provide a device in which the complete number of hundreds of revolutions of the shaft will be indicated.

Other objects are to provide a counter which will be comparatively simple in operation and manufacture, which will be positive in its action, and which will not be liable to get out of order.

Other objects will in part be obvious and in part be pointed out hereinafter.

In the accompanying drawing, showing an illustrative embodiment of the invention and in which the same reference numerals refer to similar parts in the several figures, Figure 1 is an elevational view of the device. Fig. 2 is a sectional view taken on the line 2—2 of Fig. 3. Fig. 3 is a sectional view taken on the line 3—3 of Fig. 1. Fig. 4 is a sectional view taken on the line 4—4 of Fig. 2. Fig. 5 is a sectional view taken on the line 5—5 of Fig. 4. Fig. 6 is a detail perspective view of one of the dials.

Referring to the drawings, 1 indicates a casing, preferably of metal, in which a spindle 2 is mounted. The spindle has both of its ends projecting from the casing and they are preferably pointed as indicated at 3 whereby they are adapted to engage the shaft, the revolutions of which are to be counted. As shown one of the ends 4 of the spindle is preferably formed of a separate piece and is secured in position by a pin 5. Adjacent each of the projecting ends of the spindle the casing 1 is provided with pins 6 adapted to engage a bayonet slot 7 in a handle 8, which handle is hollow and adapted to fit over either one of the ends of the spindle. It will be understood that the handle 8 is placed over either end of the spindle 2 and secured to the casing 1 by means of the pins 6 and bayonet slot 7 depending on whether the counter is to be used right handed or left handed.

The spindle 2 is provided intermediate its ends with a worm 9 adapted to engage an annular worm wheel 10 which is positioned in an annular recess 11 provided in the casing 1 and which is journaled upon the intervening cylindrical portion 12 of the casing which forms a stub shaft. Secured to the outer surface of the worm wheel 10 in any suitable manner, as for example by a pin 13, is an annular dial member 14 provided with the usual marks for indicating the number of revolutions of the spindle 2. As shown, the dial member 14 is provided with one hundred marks from which it will, of course, be understood that it will make a complete revolution for every one hundred revolutions of the spindle.

Rotatably mounted upon the reduced outer end portion of the stub shaft 12 in the casing 1 is a second annular dial member 15 which member bears numerals from zero to nine, and the purpose of which member is to indicate the number of complete revolutions of the dial member 14. A plate 16 provided with an aperture 17 overlies the number bearing surface of the dial 15 and is held in position upon the casing 1 in any suitable manner, as for example, by a screw 18. The plate 16 is prevented from rotating by means of a pin 19 which is secured thereto and which engages a recess in the casing. The number upon the dial 15 indicating the complete number of revolutions of the dial 14 will be visible through the aperture 17 of the plate 16.

The manner in which the dial 15 is actuated will now be described: The dial 15 is provided with an inwardly extending annular portion 20 provided in its periphery with notches 21, and having a diameter substantially equal to the diameter of the cylindrical body portion of the shaft 12. The worm wheel 10 is provided with a recess 22 in which a spring 23 is mounted, which spring engages a pawl 24 adapted to ride in a slot 25. The spring normally urges the pawl inward into engagement with the periphery of the shaft 12 of the casing. This shaft 12 is provided with a recess 26 into which the spring 23 forces the pawl 24 during each revolution of the worm wheel 10. When the pawl 24 is forced into the recess 26 it will engage one of the notches 21 in the annular portion 20 of the dial 15, and, while so locked with the dial 15, further rotation of the worm wheel 10 will of course cause a rotation of the dial 15. The cut-out portion or recess 26 is of such a length that the pawl 24 will rotate the dial 15 a distance equal to the distance between adjacent numerals appearing on its face.

It will thus be seen from the above description that for every revolution of the worm wheel 10 and the dial 14 attached thereto, the dial 15 will be rotated a distance corresponding to the distance between adjacent numerals thereon, and that, therefore, the numeral on the dial 15 which is visible through the aperture 17 indicates the number of complete revolutions of the dial 14, or in other words, the number of hundreds of revolutions of the spindle 2 and therefore of the shaft, the revolutions of which are to be counted. In order to prevent the dial 15 from being inadvertently rotated, it is held in position by means of a spring pressed ball 27 positioned in a recess 28 of the casing 1, and adapted to engage any one of a number of recesses 29 formed on the lower surface of the annular member 20. The spring which presses the ball into its locking position will, of course, yield and permit the rotation of the dial 15 when acted upon by the pawl 24, as above described. The dial 15 is preferably provided with a knurled flange or rim 30 which may be grasped by the fingers to rotate the dial when it is desired to set it back to its zero position.

Having described this invention in connection with the illustrative embodiment thereof, to the details of which disclosure this invention is not, of course, to be limited, what is claimed as new and what is desired to be secured by Letters Patent is set forth in the appended claims:

1. In a revolution counter, in combination, a casing having an annular recess in one of its exterior faces, the intervening casing portion forming a stub shaft, a spindle rotatably mounted in said casing, an annular dial rotatably mounted within said recess upon the said shaft and being connected operatively with the said spindle to indicate the number of revolutions of the same, the said shaft having a reduced outer end portion, the said dial and the casing being provided with coöperating indicating means, and a second annular dial rotatably mounted within the casing recess upon the reduced shaft end inwardly of the first dial and concentric thereto, the second dial being connected with the first dial to indicate the number of revolutions of the latter, the second dial and the stub shaft having coöperating indicating means.

2. In a revolution counter, in combination, a casing having an annular recess in one of its exterior faces, the intervening casing portion forming a stub shaft, a spindle rotatably mounted in said casing, an annular dial rotatably mounted within said recess upon the said shaft and being connected operatively with the said spindle to indicate the number of revolutions of the same, the said shaft having a reduced outer end portion, the said dial and the casing being provided with coöperating indicating means, a second annular dial rotatably mounted within the casing recess upon the reduced shaft end inwardly of the first dial and concentric thereto, the second dial being connected with the first dial to indicate the number of revolutions of the latter, the second dial and the stub shaft having coöperating indicating means, the second dial also having a radially projecting portion overlying the outer face of the first dial.

In testimony whereof I have signed my name to this specification in the presence of two subscribing witnesses.

OSCAR D. HAPGOOD.

Witnesses:
CHARLES D. SEVERANCE,
ALLEN P. JONES.

Copies of this patent may be obtained for five cents each, by addressing the "Commissioner of Patents, Washington, D. C."